United States Patent [19]

Kasahara

[11] 4,205,536

[45] Jun. 3, 1980

[54] REFRIGERATING APPARATUS

[75] Inventor: Keisuke Kasahara, Tokyo, Japan

[73] Assignee: Kabushiki Kaisha Maekawa Seisakusho, Tokyo, Japan

[21] Appl. No.: 880,166

[22] Filed: Feb. 22, 1978

[30] Foreign Application Priority Data

| Mar. 1, 1977 [JP] | Japan | 52/22329 |
| Mar. 1, 1977 [JP] | Japan | 52/24985[U] |
| Apr. 26, 1977 [JP] | Japan | 52/53083[U] |
| Apr. 26, 1977 [JP] | Japan | 52/53084[U] |
| May 16, 1977 [JP] | Japan | 52/62423[U] |
| May 20, 1977 [JP] | Japan | 52/65678[U] |

[51] Int. Cl.$^2$ ............................................. F25D 25/04
[52] U.S. Cl. ...................................... 62/380; 62/303
[58] Field of Search ................... 62/63, 303, 345, 374, 62/375, 380; 165/94

[56] References Cited

U.S. PATENT DOCUMENTS

| 1,822,077 | 9/1931 | Birdseye | 62/303 |
| 3,584,471 | 6/1971 | Powell | 62/380 |

*Primary Examiner*—Ronald C. Capossela
*Attorney, Agent, or Firm*—James E. Nilles

[57] ABSTRACT

A refrigerating apparatus for refrigerating an object comprising a cooler and a transfer belt for transferring said object on said cooler, said cooler being contacted with said transfer belt directly or through a slidable layer or powder. Said slidable layer or powder consists of a heat-conducting and slidable substance.

7 Claims, 22 Drawing Figures

REFRIGERATING APPARATUS

This invention relates to a refrigerating apparatus in which a food etc. is cooled or refrigerated while it is transferred on a cooler.

In the case of a refrigerating apparatus of the prior arts using a belt conveyer, the back of the belt conveyer is sprayed with a refrigerant such as brine etc. or dipped in said refrigerant, or a refrigerant such as carbon dioxide or nitrogen gas etc. is sprayed directly on an object to be refrigerated placed on said conveyer, so that said object is cooled, or is, by cooling further the conveyer surface by cold airblast, refrigerated. In case a primary refrigerant such as nitrogen, freon etc. is sprayed, there are problems with respect to the safety, the economy and the designing of apparatus in point of preventing the leakage of gas. When a secondary refrigerant such as brine or ethylene glycol etc. is sprayed on the lower surface of the conveyer, or said conveyer is dipped in said secondary refrigerant, there arises a drawback that a large power is needed for rotating the conveyer due to the improved viscosity of said secondary refrigerant caused by the low temperature. There is another problem arisen from the water suction in controlling the density of refrigerant because said means is a wet type.

A first object of this invention is to obviate said disadvantages by refrigerating the object to be refrigerated while it is transferred on the cooler without spraying a refrigerant on said object or dipping said object in the refrigerant.

A second object of this invention is to prevent a transfer belt which contacts with the cooler while it transfers said object to be refrigerated from sticking to the cooler by being frozen. A first example to accomplish said object is to form said transfer belt of a synthetic resin film. A second example is to form said transfer belt of a carbon filament fabric. A third example is to lay a slidable layer consisting of a heat-conducting and slidable substance on the sliding surface of said transfer belt or said cooler, and to arrange a sucking means to prevent said cooler from being separated from the transfer belt. A fourth example is to lay a heat-conducting and slidable powder on the sliding surface of the cooler with the transfer belt. A fifth example is to lay an antifreeze liquid on the sliding surface of the cooler with the transfer belt. A sixth example is to arrange a device for applying an antifreeze liquid on the back of the transfer belt at the upstream side with respect to the cooler.

A third object of this invention is to transfer scrapers on the cooler in order to prevent the object to be refrigerated which contacts directly with the cooler while it is transferred from sticking to the conveyer by being frozen.

These and further objects as well as features of this invention will become readily evident from the following description when considered in conjunction with explanations of accompanying drawings, in which, FIG. 1 is a side view of a refrigerating apparatus showing an embodiment of this invention;

An embodiment in which a transfer belt is formed of a synthetic resin film will be described according to FIGS. 1, 2 and 3.

Figure 1:
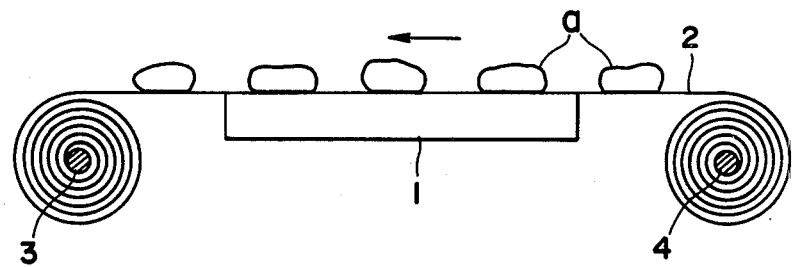
Figure 2:
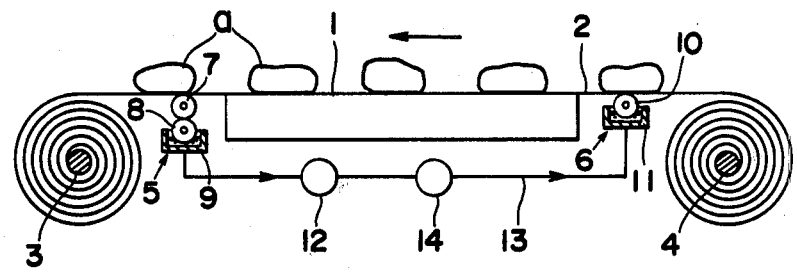
FIGS. 2, 3 and 4 are side views of a refrigerating apparatus showing another embodiments of this invention.

In FIG. 1, 1 is a flat box-shaped cooler (evaporator) having a smooth surface, inside of which a snaky path of refrigerant is provided through which a primary refrigerant (such as freon or ammonia liquid etc.) or a secondary refrigerant (such as brine or ethylene glycol etc.) is flown. In the meantime, all the coolers 1 in other embodiments are constructed in the identical structure.

2 is a transfer belt formed of a thin polyester resin film etc. being not thicker than 0.1 mm. Said transfer belt 2 contacts with the surface of said cooler 1, and both ends thereof are taken up by both take-up shafts 3, 4 which are arranged near both longitudinal ends of said cooler 1.

The function of the aforesaid embodiment will be described hereafter. An object to be refrigerated a such as a food etc. is placed on said transfer belt 2 which is transferred on said cooler 1. When a cold air is blasted compulsorily from the upper side while said transfer belt 2 is advanced by a rotation of one of said take-up shafts 3 to the left-hand side as shown by an arrow, said object to be refrigerated a is cooled and refrigerated after having contacted with said cooler 1 through said transfer belt 2. When the quantity of said transfer belt 2 remaining on the other take-up shaft 4 becomes small, said transfer belt 2 is taken up by said take-up shaft 4 so that the transfer belt 2 is advanced to the opposit direction. Said object a having been refrigerated on said cooler 1 is removed to another place.

Under certain circumstances, an antifreeze liquid such as ethylene glycol is applied on the back of said transfer belt 2 so that said transfer belt 2 formed of the thin synthetic resin film contacts intimately with the upper surface of said cooler 1 at the location thereof. In the aforesaid case, a wiping device 5 and an applying device 6 are arranged so as to face to the back of the transfer belt 2, as shown in FIG. 2 at the downstream side and the upstream side respectively with respect to said cooler 1. Said wiping device 5 consists of a wiping roller 7 made of a sponge which contacts with the back of said transfer belt 2, a squeezing roller 8 made of steel which squeezes said wiping roller 7 and a receiving vessel 9, while the applying device 6 consists of an applying roller 10 which contacts with the back of the transfer belt 2 and a liquid container 11 for accumulating the antifreeze liquid such as ethylene glycol etc. in which said applying roller 10 is dipped, then said liquid container 11 is connected to said receiving vessel 9 through a pump 12 and a return pipe 13. A concentrating device 14 inside of which a heater is contained is mounted at an intermediate point of said return pipe 13. The thickness of said transfer belt 2 may be 0.1 mm or more, as the case may be, in consideration of the weight etc. of said object to be refrigerated a.

In the case of aforesaid embodiment, the antifreeze liquid such as ethylene glycol etc. is applied by the applying roller 10 on the back of said transfer belt 2 at the upstream side with respect to said cooler 1 so that said transfer belt 2 contacts intimately with the surface of said cooler 1 leaving no space therebetween by the viscosity of the antifreeze liquid.

The antifreeze liquid having been applied on said transfer belt 2 is wiped off by said wiping roller 7 at the down stream side with respect to the cooler 1 so that the antifreeze liquid is not transferred any further. The antifreeze liquid having been wiped off by said wiping roller 7 is squeezed by said squeezing roller 8 and is accumulated in said receiving vessel 9, then returned to said liquid container 11 through said return pipe 13.

An embodiment shown in FIG. 3 will be described hereafter. In case the transfer belt 2 formed of the synthetic resin film is strong enough, it can be formed in an endless conveyer type, being trained around driving wheels 15, 16, as shown in the drawing.

An embodiment in which a transfer belt is formed of a carbon filament fabric will be described hereafter according to FIGS. 4, 5, 6, 7 and 8.

Figure 4:
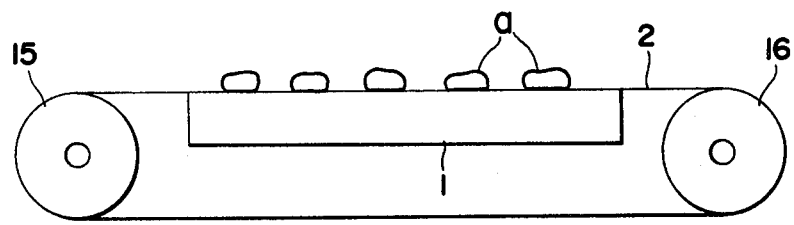
Figure 6:
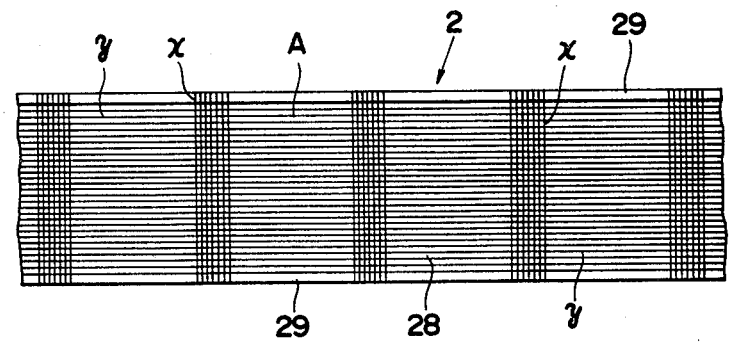
FIGS. 6, 7 and 8 are enlarged plan views of a part of said transfer belt shown in FIG. 4 in modified forms.
Figure 7:
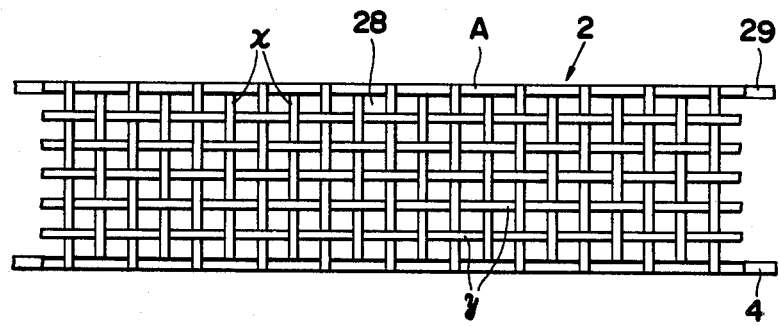
Figure 8:
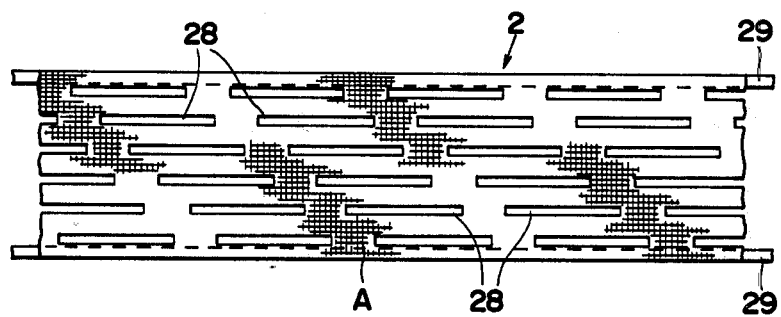

In FIG. 4, 1 is a cooler. 2 is a transfer belt composed of a belt conveyer. Said transfer belt 2 being as thin as about 0.1 mm is a fabric A so prepared that a low-temperature resisting synthetic resin such as polyester resin etc. is coated on the carbon filament fabric. The woven fabric A is so prepared that spaces are left between woofs x, as shown in FIG. 6, so that ventilating gaps 28 are produced between warps y, both woofs x and warps y are open-woven, as shown in FIG. 7, so that ventilating gaps 28 are produced therebetween, or ventilating gaps 28 are produced by punching on a woven fabric A, as shown in FIG. 8. In the case of said punching method, a treatment must be made around said ventilating gaps 28 for preventing woofs x and warps y from being frayed out. Moreover, a pair of driving belts 29, 29 such as V belts or planar belts etc. are fixed on and united with both side edges of the back of said transfer belt 2 respectively and are engaged around said driving wheels 15, 16.

The function of said embodiment will be described hereafter.

When the object to be refrigerated a is placed on said transfer belt 2 and is transferred together with said transfer belt 2, said transfer belt 2 contacts intimatly with said cooler 1 at the location of said cooler 1 by the weight of said object a so that the low temperature of said cooler 1 is conducted to said object a through said thin transfer belt 2, in addition, a coldness is conducted to said object a directly through said ventilating gaps 28 produced on the fabric A of said transfer belt 2, thus said object a is cooled and refrigerated. Since said transfer belt 2 is formed of the carbon filament fabric, it has a slidability itself and does not need to lay any slidable agent on the back thereof, consequently a better heat conduction is obtained.

Figure 9:
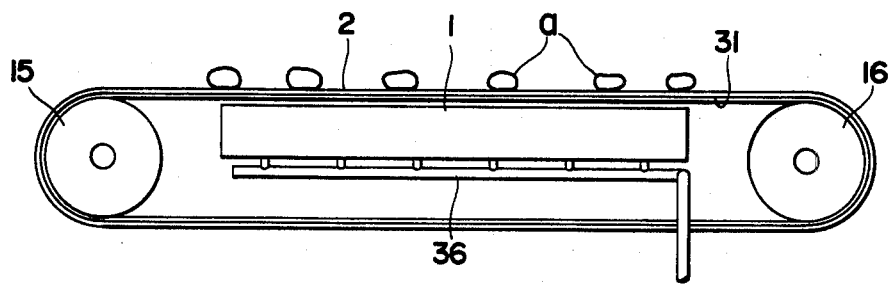
FIG. 9 is a side view of a refrigerating apparatus showing an additional embodiment of this invention.
Figure 10:
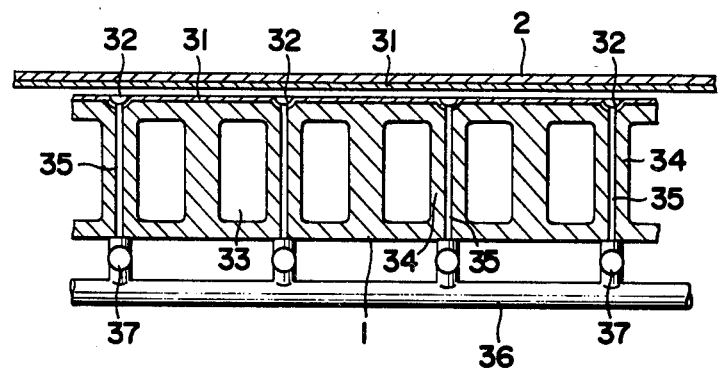
FIG. 10 is an enlarged vertical cross-sectional view of a part of a cooler shown in FIG. 9.
Figure 11:
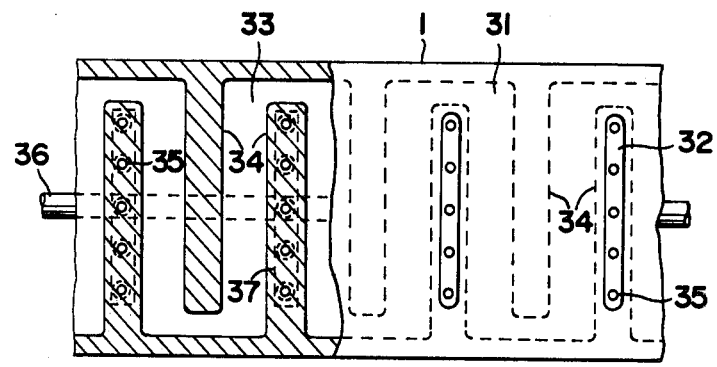
FIG. 11 is a plan view of a naked part of said cooler.

An embodiment in which a slidable layer consisting of a heat-conducting and slidable substance is laid on the sliding surface of a cooler or a transfer belt will be described hereafter according to FIGS. 9, 10 and 11.

1 is a cooler. 2 is a transfer belt composed of a belt conveyer which is made of a stainless steel, while said cooler 1 is arranged so as to contact with the back of said transfer belt 2. Said cooler 1 is an enclosed box having a long and narrow shape along with the longitudinal direction of said transfer belt 2 inside of which a snaky path 30 of a primary or secondary refrigerant is provided, and either upper surface or both upper and lower surfaces thereof contact with the back of said transfer belt 2. Furthermore, a slidable layer 31 (thickness 10/100 mm–2/100 mm) consisting of a thin film of teflon or polyester etc. is coated by heating on the overall back of said transfer belt 2 and on either the upper surface or upper and lower surfaces of said cooler 1 or on the sliding surface of either one of said cooler 1 or said transfer belt 2. A heat-conducting and slidable substance such as molybdenum bisulfide or graphite is contained in said slidable layer 31 so that a heat-conductibility as well as a slidability are given to said slidable layer 31. A plurality of suction concave portions 32 are arranged on the upper surface of said cooler 1, many suction orifices 35 are formed by penetrating vertically partition wall portions 34 arranged at other portions than a refrigerant path 33 in said cooler 1, upper ends of said suction orifices 35 are opened at the base of said suction concave portions 32, upper openings of said suction concave portions 32 contact intimately with either the back of said transfer belt 2 or said slidable layer 31 laid on the back of said transfer belt 2, lower openings of said suction orifices 35 are connected to branch pipes 37 which are branceed off from a suction pipe 36, and said suction pipe 36 is connected to a vacuum pump etc. Although suction concave portions 32 are formed in a long and narrow shape along with the breadth direction of said cooler 1 in FIG. 11, they may be formed in a long and narrow shape along with the longitudinal direction of said cooler 1, as the case may be, in response to the shape of said partition walls 34 in said cooler 1. Both sliding surfaces of said transfer belt 2 and said cooler 1 are formed smoothly regardless whether the slidable layer 31 is laid or not, so that their slidability and suction are secured.

The function of the aforesaid embodiment will be described hereafter.

Said transfer belt 2 is transferred smoothly through said slidable layer 31 containing a heat-conducting and slidable substance which is laid on at least one sliding surface of said transfer belt 2 or said cooler 1, and the object to be refrigerated a placed on said transfer belt 2 is cooled through said transfer belt 2 either by the vaporizing latent heat of the primary refrigerant or by the secondary refrigerant which has been introduced in said refrigerant path 33 located in said cooler 1. At this time, if the sucking action is produced by the vacuum pump etc. through said suction pipe 36 and suction orifices 35, said transfer belt 2 is sucked to said suction concave portions 32 located on the upper surface of said cooler 1 so that said transfer belt 2 and said cooler 1 keep their contact as intimate as possible, accordingly the effective heat-conduction can be accomplished. Also, the waving of the surface of said transfer belt 2 caused by the transformation by heat can be flattened. Furthermore, the slidability is not obstructed by the sucking power since the slidable layer 31 is laid on at least either one of said sliding surfaces, or slidable layers 31, 31 are laid on both of said sliding surfaces, so that said transfer belt 2 can be driven without any difficulty.

Figure 12:
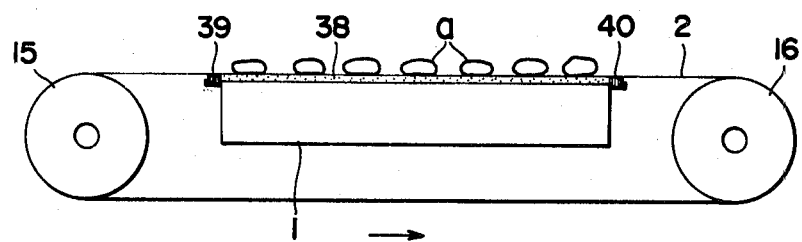
FIGS. 12, 13 and 14 are side views of refrigerating apparatuses respectively showing further embodiments of this invention.

An embodiment in which a slidable powder is laid between a cooler and a transfer belt will be described hereafter according to FIG. 12.

1 is a cooler. 2 is a transfer belt composed of a belt conveyer which is made of the stainless steel, while said cooler 1 is arranged so as to contact with the back of said transfer belt 2 along with the longitudinal direction thereof. A powder layer 38 consisting of a heat-conducting and slidable powder such as a molybdenum bisulfide powder or a graphite powder is laid in a sliding gap between said cooler 1 and said transfer belt 2. A pair of brush members 39, 40 are arranged so as to contact with the back of said transfer belt 2 at the downstream side and the upstream side with respect to the cooler 1 respectively, and the brush member 39 located at the downstream side wipes off the slidable powder while the other brush member 40 located at the upstream side contains said slidable powder and applies it on the back of said transfer belt 2.

The function of the aforesaid embodiment will be described hereafter. When the object to be refrigerated a is placed on said transfer belt 2 and then said transfer belt is transferred, said transfer belt 2 slides smoothly on said cooler 1 through said powder layer 38 and the low temperature of said cooler 38 is conducted to said object a through said transfer belt 2 favored by the heat conduction of said powder layer 38. Said powder is limited to be transferred only between said cooler 1 and said transfer belt 2 and is prevented from being transferred elsewhere by said brush members 39, 40 arranged at the downstream side and the upstream side with respect to said cooler 1.

Another embodiment in which an antifreeze liquid is laid between a cooler and a transfer belt will be described hereafter according to FIGS. 13, 14, 15, 16, 17 and 18.

Figure 13:
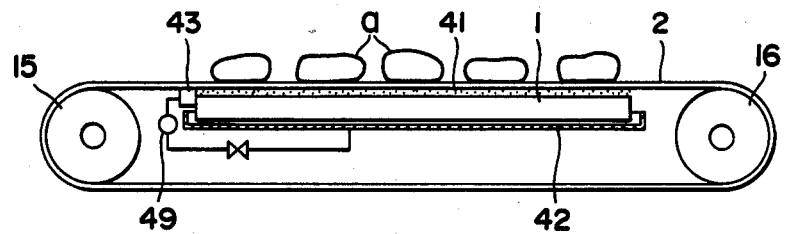
Figure 14:
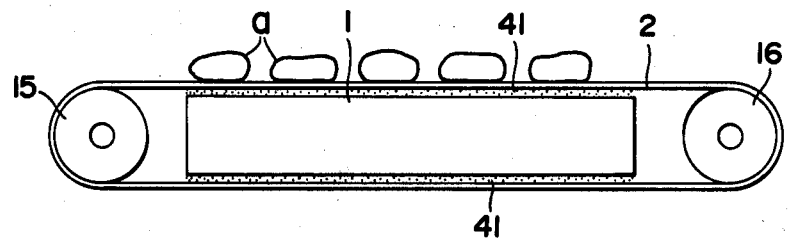
Figure 15:
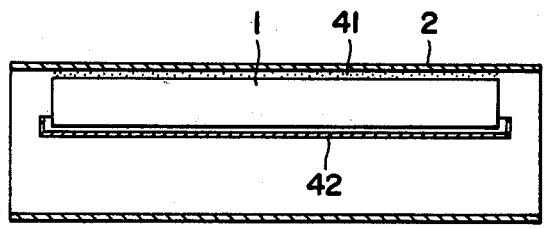
FIG. 15 is an enlarged vertical cross-sectional elevational view of the apparatus shown in FIG. 13.
Figure 16:
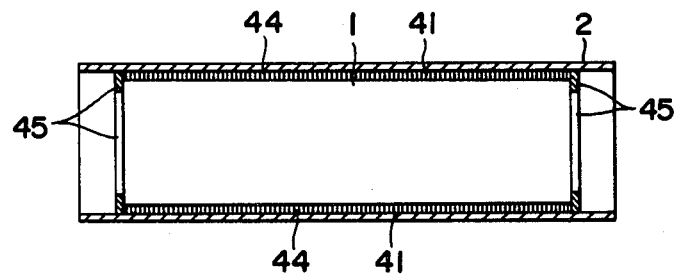
FIGS. 16, 17 and 18 are enlarged vertical cross-sectional elevational views showing more embodiments of this invention.
Figure 17:
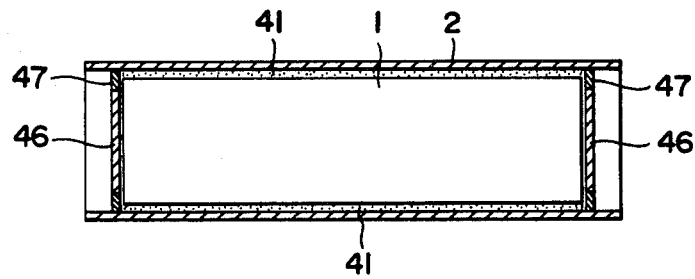
Figure 18:
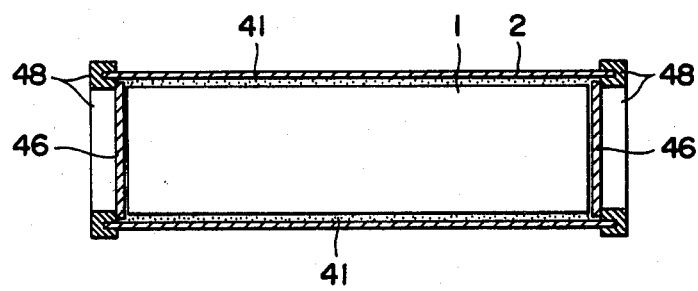

1 is a cooler. 2 is a transfer belt composed of a belt conveyer which is made of the stainless steel, while said cooler 1 is so arranged that the upper surface or both of upper and lower surfaces thereof face closely to the back of said transfer belt 2 along with the longitudinal direction of said transfer belt 2. Moreover, a liquid film 41 consisting of a thin film of an antifreeze liquid is laid between the back of said transfer belt 2 and the upper surface of said cooler 1, or between the back of both upper and lower sides of said transfer belt 2 and both upper and lower surfaces of said cooler 1. Said liquid film 41 removes an air existing between said cooler 1 and the back of the upper side or both upper and lower sides of said transfer belt 2 so as to let them contact each other, and also acts as a lubricant on the sliding surface between said cooler 1 and said transfer belt 2. Although said liquid film 41 is desired to be a thin film, it has not necessarily be a thin film, as the case may be, but can be a flowing liquid film having from 2.0 mm to 4.0 mm thickness according to circumstances. The following examples are thought of in order to lay said liquid film 41 always between said cooler 1 and said transfer belt 2, namely, a saucer 42 is arranged around said cooler 1, as shown by the cross-sectional view of the conveyer in FIG. 13, and the liquid accumulated in said saucer 42 is sent by a pump 49 to a header 43 from which said liquid is supplied between said cooler 1 and said transfer belt 2, or, as shown in FIG. 16, a brush 44 made of a heat-conducting substance is arranged on the upper surface of said cooler 1 so as to contact with the back of said transfer belt 2, in which brush 44 the antifreeze liquid is contained. 45 is a sealing member for preventing the leakage of antifreeze liquid which is thrusted out from the back of said transfer belt 2. An example to prevent the outflow of said liquid film 41 is that, as shown in FIG. 17, a pair of packings 47, 47 is arranged so as to contact with the back of said transfer belt 2 at upper and lower ends of side plates 46, 46 which are provided at both sides of said cooler 1, or, as shown in FIG. 18, a pair of packings 48, 48 is arranged at both side edges of said transfer belt 2 so as to contact with said side plates 46, 46. Should a gap exists between said cooler 1 and the back of said transfer belt 2, as shown in FIGS. 13 and 15, such a cooling means by the cold airblast is utilized jointly, as the case may be, that fins are arranged on the lower surface of said cooler 1 and an air is blown compulsorily toward said fins on the cooler 1 from one side of said transfer belt 2 so that the cold airblast is released therefrom and is introduced to the upper surface of said transfer belt 2, or another cooler is prepared from which a cold airblast is blown to the upper surface of said transfer belt 2.

The function of the aforesaid embodiment will be described hereafter.

The primary refrigerant is introduced into said cooler 1 and is evaporated there, or the precooled secondary refrigerant such as brine etc. is introduced into said cooler 1 so as to cool the cooler 1, and the low temperature thereof is conducted to said metal transfer belt 2 through said liquid film 41 so that the object to be refrigerated a placed on said transfer belt 2 is cooled and refrigerated. At this time, the liquid film 41 consisting of the antifreeze liquid laid between said cooler 1 and said transfer belt 2 removes the air between them and is laid as the heat-conducting member for improving the heat conduction and is also effected as the lubricating agent between them. If said transfer belts 2, 2 contact with the top and bottom of said object to be refrigerated a, said object a is cooled from both sides. According to circumstances, a means to shorten the freezing time is adopted jointly by blowing the cold airblast in addition to said refrigerating means of conducting the low temperature.

Figure 19:
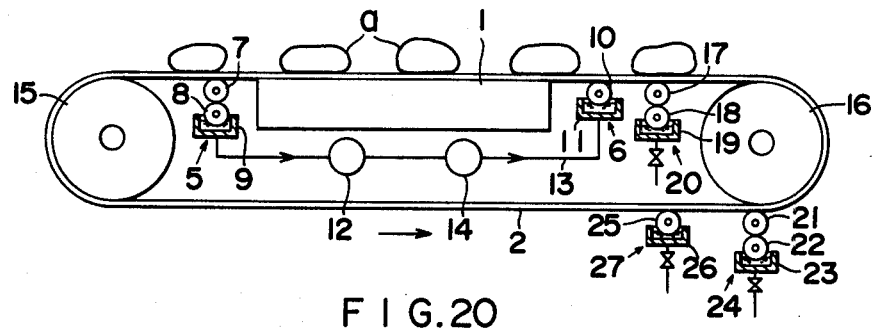
FIGS. 19 and 20 are side views of refrigerating apparatuses showing furthermore embodiments of this invention.

An embodiment in which an antifreeze liquid applying device is adopted will be described hereafter according to FIG. 19.

1 is a cooler. 2 is a transfer belt such as a belt conveyer etc. consisting of a carbon filament fabric or a glass filament fabric being not thicker than 0.1 mm on which a low-temperature resisting resin such as teflon resin, polyester resin etc. is coated, or a low-temperature resisting synthetic resin sheet such as of polyester etc. having about 0.5 mm thickness. 6 is an antifreeze liquid applying device consisting of an antifreeze liquid container 11 which accumulates the antifreeze liquid such as ethylene glycol, brine etc. and a sponge roller 10 which is dipped the lower portion thereof in said antifreeze liquid container 11. Said sponge roller 10 contacts with the back of said transfer belt 2 and rotates according to the movement of said transfer belt 2. Said antifreeze liquid applying device 6 contacts with the back of said transfer belt 2 at the upstream side with respect to said cooler 1. A wiping device 5 is arranged at the downstream side with respect to said cooler 1. Said wiping device 5 consists of a sponge roller 7 which contacts with the back of the transfer belt 2 and rotates interlockingly with it, a squeezing roller 8 made of a hard material which is pressed against the lower side of the sponge roller 7 and a receiving vessel 9 provided under the squeezing roller 8. A return pipe 13 lead from the receiving vessel 9 is connected to said antifreeze liquid container 11 through a pump 12 and a concentrating device 14. A water-drop wiping device 20 is arranged at the upper stream side with respect to said antifreeze applying device 6. Said water drop wiping device 20 consists of a sponge roller 17 which contacts with the back of the transfer belt 2 and rotates interlockingly with it, a squeezing roller 18 made of a hard material which is pressed against the lower side of the sponge roller 17 and a drainer 19. A wiping device 24 is arranged on the outer surface of the transfer belt 2. Said wiping device 24 consists of a sponge roller 21 which contacts with the outer surface of the transfer belt 2 and rotates interlockingly with it, a squeezing roller 22 and a drainer 23. A disinfecting and sterilizing device 27 is arranged at the upstream side with respect to said wiping device 24. Said disinfecting and sterilizing device 27 consists of a liquid applying sponge roller 25 which contacts with outer surface of the transfer belt 2 and rotates interlockingly with it and a liquid agent container 26 which applies a liquid agent for the disinfection and sterilization to said sponge roller 25.

A V belt or the planar belt is fixed on and is united with both side edges of said transfer belt 2 which is engaged around driving wheels 15,16. Should outer circumferences of said driving wheels 15, 16 are covered with rubber linings, the V belt or the planar belt may not be utilized.

The function of the aforesaid embodiment will be described hereafter.

When the object to be refrigerated a such as a meat etc. is placed on said transfer belt 2 and is transferred, the transfer belt 2 contacts intimately with the cooler 1 at the location of the cooler 1 by the weight of the object to be refrigerated a, so that the low temperature of the cooler 1 is conducted through the thin transfer belt 2. When said transfer belt 2 is formed of the carbon filament fabric or is coated with the teflon resin, the heat conducting effect is improved due to the good heat conduction thereof. If necessary, the cold airblast may be blown toward the object to be refrigerated a from the upper side of the transfer belt 2. Thus, the object to be refrigerated a placed on said transfer belt 2 is cooled and refrigerated. At the same time, the antifreeze liquid such as ethylene glycol etc. accumulated in the antifreeze liquid container 11 is applied on the back of said transfer belt 2 by the sponge roller 10 containing said antifreeze liquid in order to prevent the freezing of dewdrops existing on the contacting surface of the cooler 1 with the back of said transfer belt 2 so that said transfer belt 2 is contacted intimately and evenly with said cooler 1, consequently the heat conduction is improved favored by the heat-conducting effect of the antifreeze liquid which is also effected as the slidable agent.

When said transfer belt 2 is advanced beyond the location of said cooler 1, the antifreeze liquid deposited on the back thereof is wiped off by said sponge roller 7. The antifreeze liquid having been contained in the sponge roller 7 is squeezed by the squeezing roller 8 and is accumulated in said receiving vessel 9 then returned again to the antifreeze liquid container 11 through the return pipe 13. The antifreeze liquid is, on its way to return, replenished or heated and concentrated by the concentrating device 14. Said wiping devices 20, 24 wipe off water-drops having been condensed on the surface of said transfer belt 2 in order to prevent waterdrops from being mixed in the antifreeze liquid, also from being frozen on said transfer belt 2 as well as on the object to be refrigerated. The surface of said transfer belt 2 is disinfected and sterilized by the disinfecting and sterilizing device 27, and then the liquid agent is wiped off by the succeeding wiping device 19 before said portion of said transfer belt 2 is advanced to the downstream side again.

Figure 3:
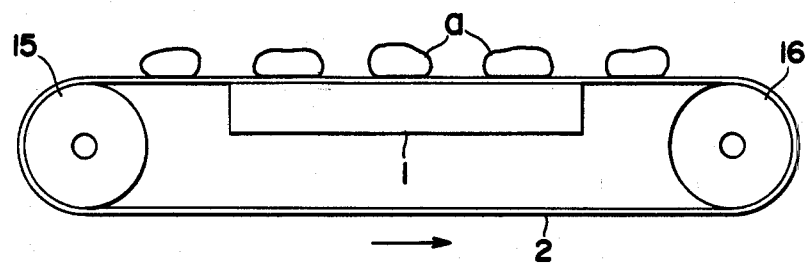

In case said transfer belt 2 is formed of the synthetic resin film, as shown in FIG. 3, said antifreeze liquid applying device 6, the wiping devices 5, 20, 24 may be utilized, under certain circumstances, as a means for contacting said film with said cooler 1 intimately.

Figure 20:
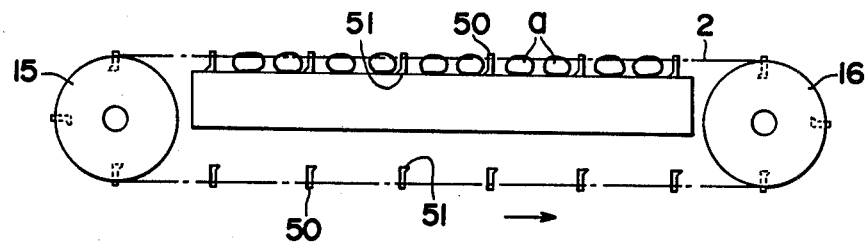
Figure 21:
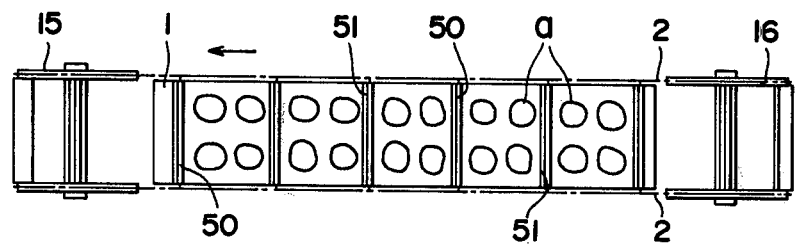
FIG. 21 is a plan view of the apparatus shown in FIG. 20.
Figure 22:
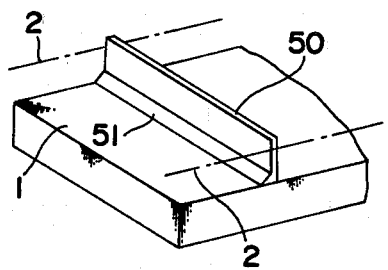
FIG. 22 is a perspective view of the apparatus shown in FIG. 20.

An embodiment in which a transfer belt is formed of a chain conveyer will be described hereafter according to FIGS. 20, 21 and 22.

1 is a cooler. 2 is a transfer belt composed of a chain conveyer which is introduced to driving wheels 15, 16 by sprocket wheels. Scrapers 50 are so fixed on said transfer belt 2 at suitable intervals that tip ends thereof rub the upper surface of said cooler 1. Since said scrapers 50 rub the upper surface of said cooler 1 being made of metal, an oilless synthetic resin is adopted as the material thereof, with which metals such as molybdenum, gun metal, aluminum bearing metal and/or phosphor bronze etc., or powder of carbon, glass filament and/or carbon filament is mixed.

The function of the aforesaid embodiment will be described hereafter.

When the object to be refrigerated a is placed on said cooler 1, and said transfer belt 2 is driven, said object to be refrigerated a placed on said cooler 1 is pushed by the scraper 50 and slides on the surface of said cooler 1. The object to be refrigerated a having sticked to said cooler 1 by being frozen is teared off by the tip end 51 of said scraper 50 and is transferred. The object to be refrigerated a placed between scrapers 50, 50 is pushed by the succeeding object a.

In a further embodiment, either one of a cooler 1 and transfer belt 2 is provided with a permanent magnet and the other is made of magnetic material.

Figure 5:
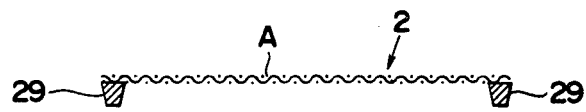
FIG. 5 is a vertical cross-sectional elevational view of a transfer belt shown in said FIG. 4.

Namely, said transfer belt comprises mainly rubber or fluoro carbon resin and further comprises a powder of permanent magnet, one or more kinds of antifriction agents having a good heat conductivity such as powders of Teflon, graphite, molybdenum, copper and aluminum, and a binder such as a powder of epoxy resin or other synthetic resin. Said powder of permanent magnet may be dispersed into or arranged on a line in said transfer belt. A pair of reinforcing belts 29, 29 as shown in FIG. 5 is fixed on both side edges of said transfer belt 2.

On the other hand, the sliding surface portion of said cooler 1 is made of magnetic material such as iron.

If the sliding surface of the cooler 1 is provided with a permanent magnet, the transfer belt may be made of a magnetic material.

In this invention, as is apparent from the foregoing, the object to be refrigerated is refrigerated on the cooler while it is transferred by the transfer belt, so that it is unnecessary to worry about an excessive capacity of pump or a prevention of gas leakage compared with the prior arts in which the brine is sprayed on the belt or the refrigerant gas is sprayed, hence the safety and economy are improved. Moreover, it is unnecessary in this invention to fear the increase of power of pump and the stain of refrigerant caused by the improved viscosity of low-temperatured refrigerant in comparison with the prior method in which the object to be refrigerated is sprayed with or is dipped in the secondary refrigerant such as ethylene glycol etc., so that the power of pump can be reduced to from ⅓ to ½ of the prior means. Should the transfer belt is formed of the synthetic resin film, said transfer belt is prevented from sticking to the cooler by being frozen in the process that the transfer belt is contacted with the surface of cooler, and the object to be refrigerated is transferred on said transfer belt. In case the carbon filament fabric is utilized as the transfer belt, the heat conduction as well as the refrigerating effect are improved in addition to preventing the transfer belt from sticking to the cooler by being frozen. In case the slidable layer consisting of the temperature conducting and slidable substance is formed on at least either one sliding surface of the cooler or the transfer belt, the transfer belt is prevented from sticking to the cooler by being frozen unrelatedly with the material of transfer belt. The tendency that the cooler and the transfer belt separate each other by the slidable layer existing between them can be obviated by adopting the sucking means jointly. In case the heat-conducting and slidable powder is laid between sliding surfaces of the cooler and the transfer belt, a simplified means for preventing the outflow of said powder can be accomplished compared with the case in which the liquid is laid. In case the liquid film consisting of the antifreeze liquid is laid between sliding surfaces of the cooler and the transfer belt, the transfer belt can be prevented from sticking to the cooler by being frozen, and the intimate contact of the transfer belt with the cooler can be improved. In case the applying device is arranged for applying the antifreeze liquid on the back of the transfer belt, no device is required for laying the antifreeze liquid always between the transfer belt and the cooler, hence the heat conducting effect is improved by laying the very thin film of the antifreeze liquid. In case scrapers are let to slide on the cooler, the object to be refrigerated is contacted directly with the cooler so that the refrigerating effect is improved, in addition, scrapers are utilized for tearing off and transferring said object to be refrigerated.

What is claimed is:

1. A refrigerating apparatus characterized by comprising a cooler, a transfer belt for transferring an object to be refrigerated while contacting with the surface of said cooler, an applying device for applying an antifreeze liquid on the back of said transfer belt, said applying device arranged at the up-stream side of said transfer belt with respect to said cooler, a wiping device for wiping the antifreeze liquid from the back of said transfer belt, said wiping device arranged at the downstream side of said transfer belt with respect to said cooler, and a liquid return pipe having a pump and a concentrating device for connecting said wiping device with said applying device.

2. The refrigerating apparatus as claim in claim 1 wherein said transfer belt consists of a smooth and frictionless carbon filament fabric.

3. The refrigerating apparatus as claimed in claim 1 wherein said transfer belt consists of a metal sheet.

4. The refrigerating apparatus as claimed in claim 1 wherein said transfer belt consists of a synthetic resin film.

5. The refrigerating apparatus as claimed in claim 1 wherein both ends of said transfer belt are taken up around take-up shafts arranged near both longitudinal ends of said cooler.

6. The refrigerating apparatus as claimed in claim 1 wherein said transfer belt consists of an endless belt, both ends of which are taken up around take-up shafts arranged near both longitudinal ends of said cooler.

7. The refrigerating apparatus as claimed in claim 1 wherein said transfer belt consists of an endless stainless steel belt.

* * * * *